US011800038B1

(12) United States Patent
Sato

(10) Patent No.: US 11,800,038 B1
(45) Date of Patent: Oct. 24, 2023

(54) DETERMINATION OF AN OCCURANCE OF AN ABNORMALITY IN AN IMAGE FORMING DEVICE AND CONTROL METHOD THEREOF

(71) Applicant: TOSHIBA TEC KABUSHIKI KAISHA, Tokyo (JP)

(72) Inventor: Yoji Sato, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/898,680

(22) Filed: Aug. 30, 2022

(51) Int. Cl.
  *H04N 1/32* (2006.01)
  *H04N 1/00* (2006.01)
  *G06F 3/12* (2006.01)

(52) U.S. Cl.
  CPC ......... *H04N 1/32635* (2013.01); *G06F 3/121* (2013.01); *G06F 3/1211* (2013.01); *G06F 3/1229* (2013.01); *H04N 1/00204* (2013.01); *H04N 1/00931* (2013.01); *H04N 1/32657* (2013.01); *H04N 1/32662* (2013.01); *H04N 1/32694* (2013.01)

(58) Field of Classification Search
  None
  See application file for complete search history.

(56) References Cited

U.S. PATENT DOCUMENTS

| | | | | |
|---|---|---|---|---|
| 2002/0171681 A1* | 11/2002 | Nomura | ............... | G03G 15/502 715/772 |
| 2005/0021721 A1* | 1/2005 | Takahashi | .......... | H04N 1/32662 709/223 |
| 2009/0097870 A1* | 4/2009 | Misumi | ............. | G03G 15/5079 399/36 |
| 2014/0327924 A1* | 11/2014 | Oakley | ................... | G06F 3/121 358/1.14 |
| 2015/0109453 A1* | 4/2015 | Horiyama | ........... | H04L 43/0823 348/143 |
| 2018/0157566 A1* | 6/2018 | Komorida | ........... | G06F 11/2247 |
| 2020/0145540 A1* | 5/2020 | Yamaguchi | ........ | H04N 1/00244 |
| 2022/0294911 A1* | 9/2022 | Katsumoto | ........ | H04N 1/00037 |

FOREIGN PATENT DOCUMENTS

| | | |
|---|---|---|
| JP | 2000-81813 | 3/2000 |
| JP | 2019-116007 | 7/2019 |
| JP | 2021-124615 | 8/2021 |

* cited by examiner

*Primary Examiner* — Miya J Cato
(74) *Attorney, Agent, or Firm* — AMIN, TUROCY & WATSON, LLP

(57) ABSTRACT

An image forming device according to an embodiment includes an image display device, a sensor, a first unit, a second unit, a control unit, and a storage unit. The sensor acquires information on a phenomenon that occurs in association with occurrence of an abnormality in the own device. The first unit includes a plurality of components and performs a part of image forming processing. The second unit includes a plurality of components and performs processing that is a part of the image forming processing and is different from the processing performed by the first unit. The control unit causes the first and second units to operate at different timings and performs display for causing a user to instruct a timing at which the abnormality occurs on the image display device. The storage unit records, as abnormality information, the information acquired by the sensor and an instruction of the user.

19 Claims, 13 Drawing Sheets

DETERMINATION OF AN OCCURANCE OF AN ABNORMALITY IN AN IMAGE FORMING DEVICE AND CONTROL METHOD THEREOF

FIELD

Embodiments described herein relate generally to an image forming device and a control method.

BACKGROUND

An image forming device has been improved, and a device having higher performance has been proposed. For example, a conveyance unit capable of conveying more types of sheets, a fixing unit with less power consumption, and the like have been developed.

However, in order to implement the high performance, a structure and an operation are becoming more complicated. Therefore, when an abnormality occurs, it is more difficult to specify an abnormal portion based on a sound or a vibration. As a result, the occurring abnormality may not be efficiently determined.

DETAILED DESCRIPTION

In general, according to one embodiment, an image forming device includes an image display device, a sensor, a first unit, a second unit, a control unit, and a storage unit. The sensor acquires information on a phenomenon that occurs in association with occurrence of an abnormality in the own device. The first unit includes a plurality of components and performs a part of image forming processing. The second unit includes a plurality of components and performs processing that is a part of the image forming processing and is different from the processing performed by the first unit. The control unit causes the first unit and the second unit to operate at different timings and performs display for causing a user to instruct a timing at which the abnormality occurs on the image display device. The storage unit records, as abnormality information, the information acquired by the sensor and an instruction of the user.

Figure 1:
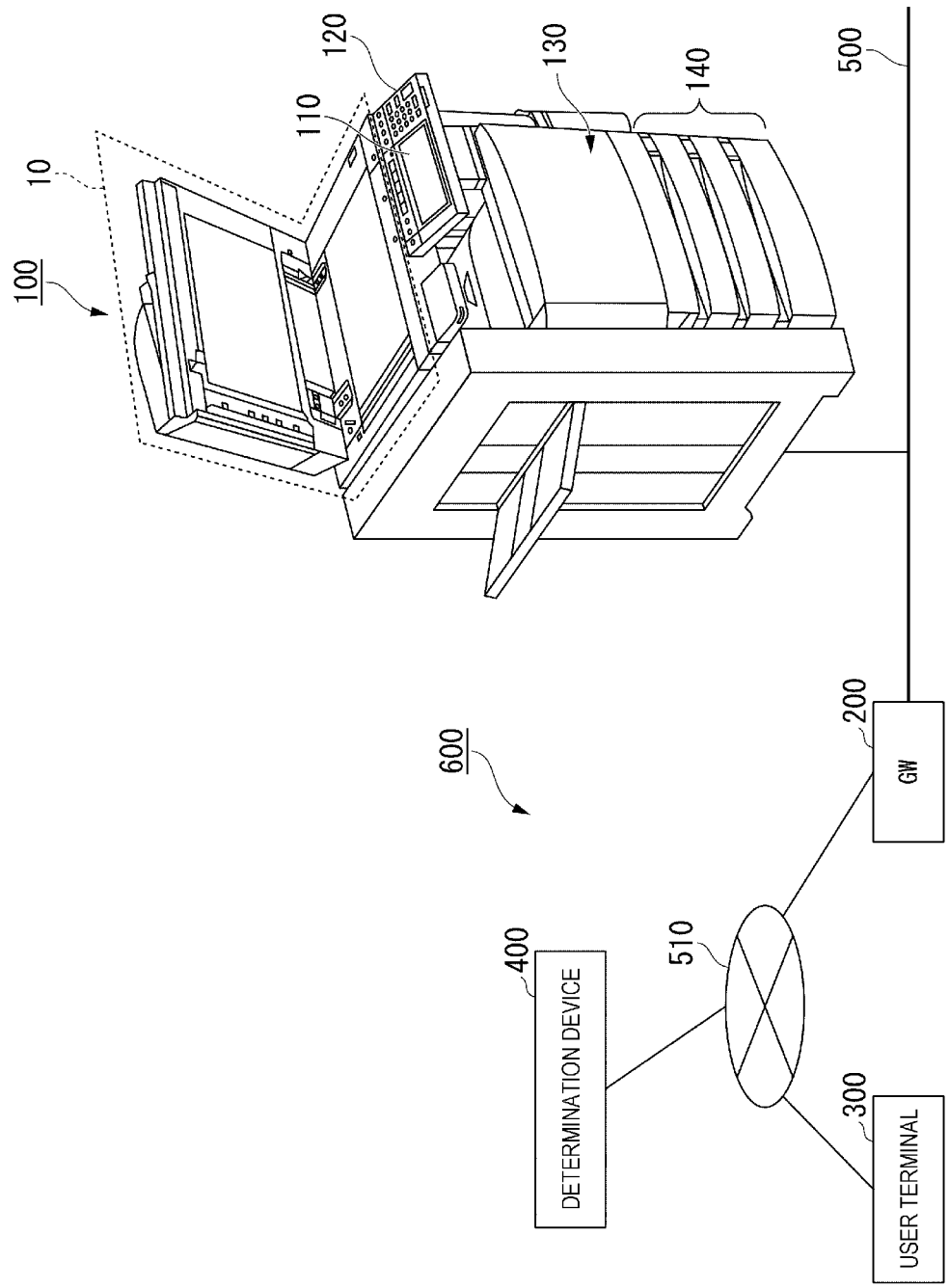
FIG. 1 illustrates a configuration example of an image forming system according to an embodiment.

Hereinafter, an image forming device and an image forming method according to an embodiment will be described with reference to the drawings. FIG. 1 illustrates a configuration example of an image forming system 600 according to the embodiment. The image forming system 600 includes, for example, one or a plurality of image forming devices 100 placed in a workplace, a user terminal 300, and a determination device 400. The image forming device 100 is a device that forms an image on a sheet. The image forming device 100 is, for example, a multifunction machine. The image forming device 100 is communicably connected to a network 510 via a network 500 such as a local area network (LAN) and a gateway (GW) 200. For example, the network 510 may be configured using the Internet or a mobile communication network.

The user terminal 300 is an information processing device used by a person who handles an abnormality in the image forming device 100 (hereinafter, referred to as an "abnormality handling person"). The user terminal 300 is, for example, the information processing device such as a smartphone, a tablet, a mobile phone, or a personal computer. The user terminal 300 receives information indicating a determination result from the determination device 400. The user terminal 300 notifies the abnormality handling person of the determination result of the determination device 400 by outputting the received information. An output of the information may be performed by screen display, may be performed by a voice output, or may be performed in another mode.

Figure 2:
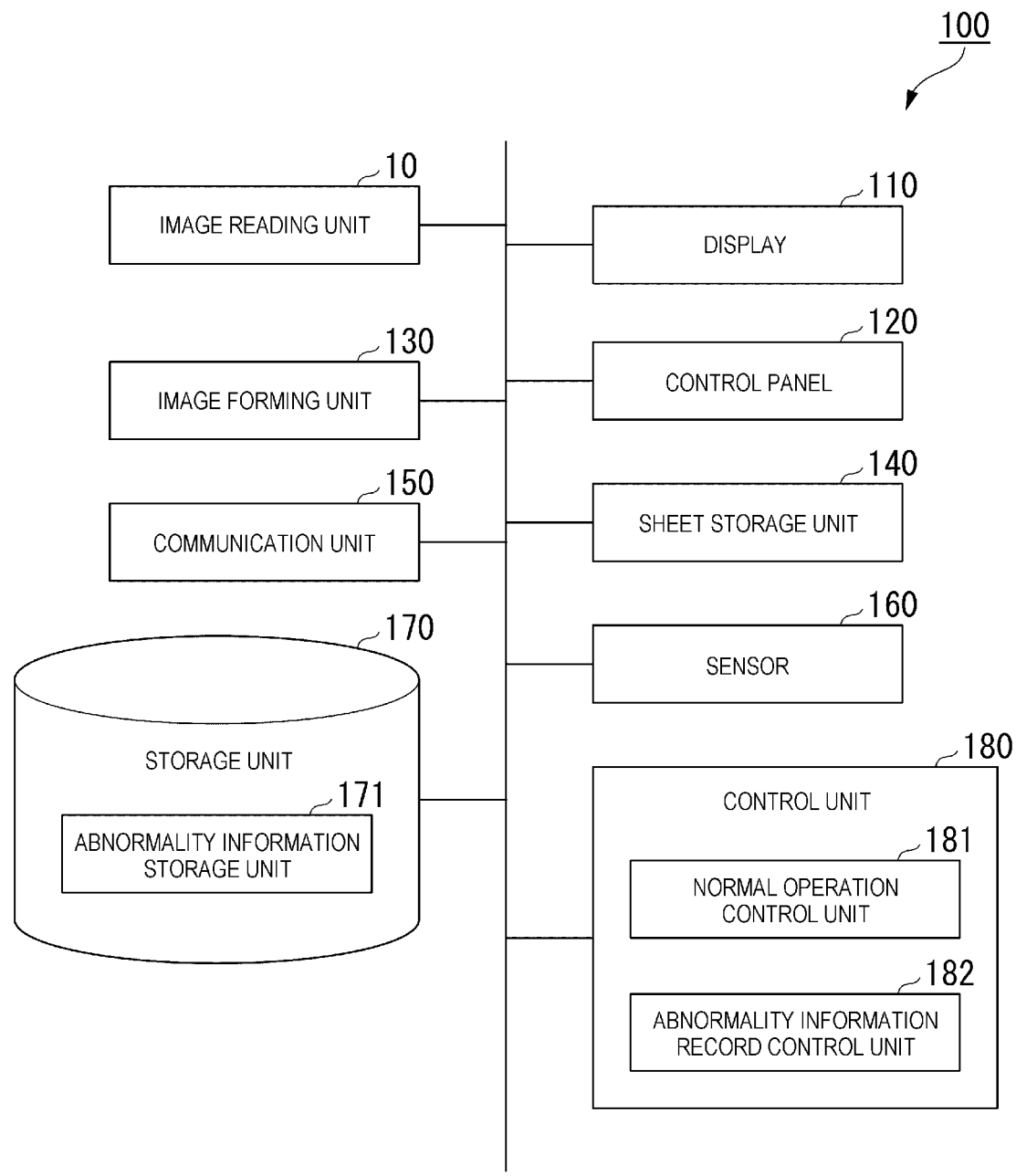
FIG. 2 is a hardware block diagram of an image forming device.

FIG. 2 is a hardware block diagram of the image forming device 100 according to the embodiment. First, the image forming device 100 will be described in detail with reference to FIGS. 1 and 2. The image forming device 100 includes an image reading unit 10, a display 110, a control panel 120, an image forming unit 130, a sheet storage unit 140, a communication unit 150, a sensor 160, a storage unit 170, and a control unit 180.

The image forming device 100 forms the image on the sheet using a developer such as a toner or an ink. When the developer is the toner, the developer is fixed to the sheet by being heated. When the developer is the ink, the developer is dropped on the sheet to form the image on the sheet. The sheet is, for example, paper or label paper. The sheet may be any material as long as the image forming device 100 can form the image on a surface of the sheet.

The image reading unit 10 reads image information to be read as brightness and darkness of light. The image reading unit 10 records the read image information. The recorded image information may be transmitted to another information processing device via the network 510. Images of the recorded image information may be formed on the sheet by the image forming unit 130.

The display 110 is an image display device such as a liquid crystal display or an organic electro luminescence (EL) display. The display 110 displays various types of information on the image forming device 100.

The control panel 120 includes operation devices such as a plurality of buttons. The control panel 120 receives an operation of a user. For example, the control panel 120 may receive an input of a numeral or a character. For example, the control panel 120 may receive an operation of selecting one or a plurality of jobs from candidates displayed on the display 110. The control panel 120 outputs a signal corresponding to the operation performed by the user to the control unit 180. The display 110 and the control panel 120 may be configured as an integrated touch panel.

The image forming unit 130 forms the image on the sheet based on the image information generated by the image reading unit 10 or the image information received via the network. The image forming unit 130 includes, for example, a photosensitive drum, an exposure device, a developing device, a transfer device, and a fixing device. A sheet conveyance path is formed in the image forming unit 130. A sheet to be processed is conveyed by rollers provided in the conveyance path. An image is formed on the sheet in a process of conveyance.

The image forming unit 130 forms the image by, for example, the following processing. The exposure device of the image forming unit 130 forms an electrostatic latent image on the photosensitive drum based on the image information. The developing device of the image forming unit 130 forms a visible image by attaching the developer to the electrostatic latent image.

The transfer device of the image forming unit 130 transfers the visible image onto the sheet. The fixing device of the image forming unit 130 fixes the visible image to the sheet by applying heat and pressure to the sheet. The sheet on which the image is to be formed may be a sheet stored and conveyed in the sheet storage unit 140, or may be a manually-fed sheet.

The sheet storage unit 140 stores the sheet used for image formation in the image forming unit 130. The sheet stored in the sheet storage unit 140 is taken out from the sheet storage unit 140 by pickup rollers. The sheet taken out from the sheet storage unit 140 is conveyed to the image forming unit 130 by conveyance rollers.

The communication unit 150 is configured using a communication interface. The communication unit 150 communicates with another device (for example, the determination device 400) via the network 500 or the network 510.

The sensor 160 acquires information on a phenomenon (for example, a vibration or a sound: hereinafter referred to as an "abnormal phenomenon") that occurs in association with occurrence of the abnormality in the own device (the image forming device 100). The sensor 160 may be configured using, for example, an audio sensor or an acceleration sensor.

The storage unit 170 is configured using a storage device such as a magnetic hard disk device or a semiconductor storage device. The storage unit 170 stores data required when the image forming device 100 operates. The storage unit 170 functions as, for example, an abnormality information storage unit 171.

The abnormality information storage unit 171 stores abnormality information. The abnormality information includes the information on the phenomenon (for example, the vibration or the sound) that occurs in association with the occurrence of the abnormality in the own device (image forming device 100). The abnormality information may further include information on a timing (hereinafter, referred to as an "abnormality occurrence timing") at which it is determined by the user (for example, the abnormality handling person) that an abnormal sound or an abnormal vibration occurs.

The control unit 180 is configured using a processor such as a central processing unit (CPU) and a memory. The control unit 180 reads and executes a program stored in advance in the storage unit 170. The control unit 180 controls an operation of each device included in the image forming device 100. The control unit 180 functions as, for example, a normal operation control unit 181 and an abnormality information record control unit 182.

The normal operation control unit 181 controls a normal operation of the own device (image forming device 100). The normal operation is an operation when the image forming device 100 functions as a normal image forming device. Examples of the normal operation include operations such as image reading processing (scanning processing) by the image reading unit 10 and image forming processing (printing processing) by the image forming unit 130.

The abnormality information record control unit 182 controls an abnormality information record operation. Abnormality information recording control is the following processing. When execution of abnormality information recording processing is instructed by the user (abnormality handling person) in the operation on the control panel 120, the abnormality information record control unit 182 starts the abnormality information recording processing. In the abnormality information recording processing, the abnormality information record control unit 182 displays a record operation screen on the control panel 120.

Figure 3:
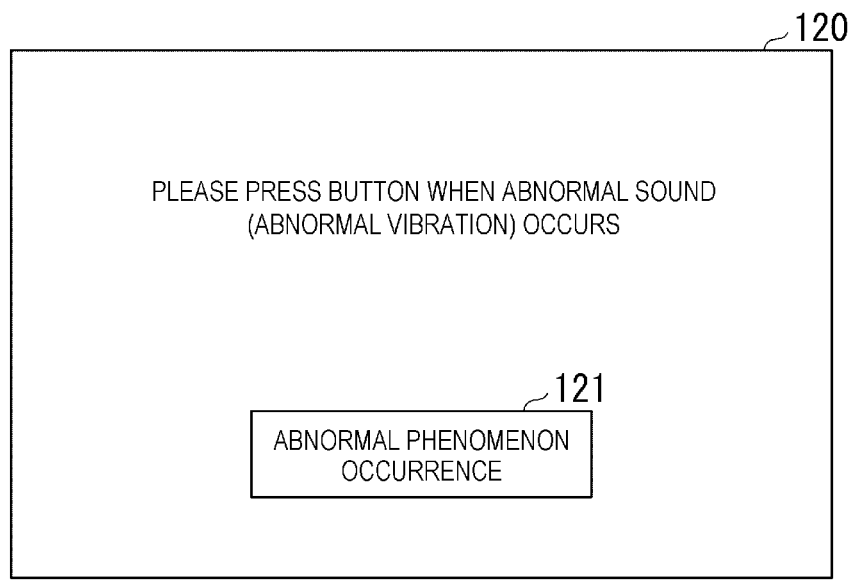
FIG. 3 illustrates a first specific example of a record operation screen.

FIG. 3 illustrates a first specific example of the record operation screen. The record operation screen includes an abnormal phenomenon occurrence instruction button 121. The abnormal phenomenon occurrence instruction button 121 is a button operated when the abnormality handling person recognizes the occurrence of the abnormal phenomenon. In order to clarify the operation, for example, information indicating at what timing the abnormal phenomenon occurrence instruction button 121 is operated may be displayed on the record operation screen. In the example of FIG. 3, "please press button when abnormal sound (abnormal vibration) occurs" is displayed. The abnormality information record control unit 182 records the timing at which the abnormal phenomenon occurrence instruction button 121 is operated in the abnormality information.

Figure 4:
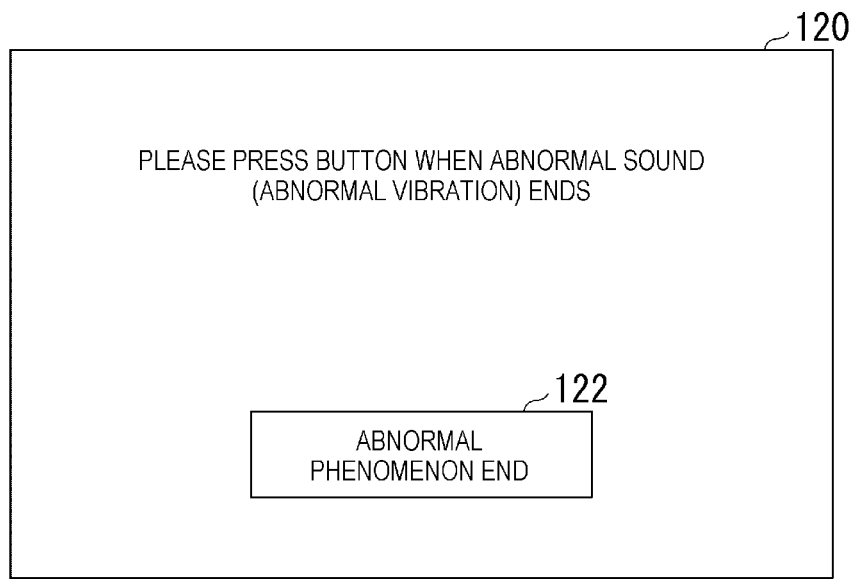
FIG. 4 illustrates a second specific example.

FIG. 4 illustrates a second specific example of the record operation screen. The record operation screen includes an abnormal phenomenon end instruction button 122. The abnormal phenomenon end instruction button 122 is a button operated when the abnormality handling person recognizes an end of the abnormal phenomenon. In order to clarify the operation, for example, information indicating at what timing the abnormal phenomenon end instruction button 122 is operated may be displayed on the record operation screen. In the example of FIG. 4, "please press button when abnormal sound (abnormal vibration) ends" is displayed. The abnormality information record control unit 182 may display the abnormal phenomenon end instruction button 122 after the abnormal phenomenon occurrence instruction button 121 is operated. The abnormality information record control unit 182 records the timing at which the abnormal phenomenon end instruction button 122 is operated in the abnormality information.

Figure 5:
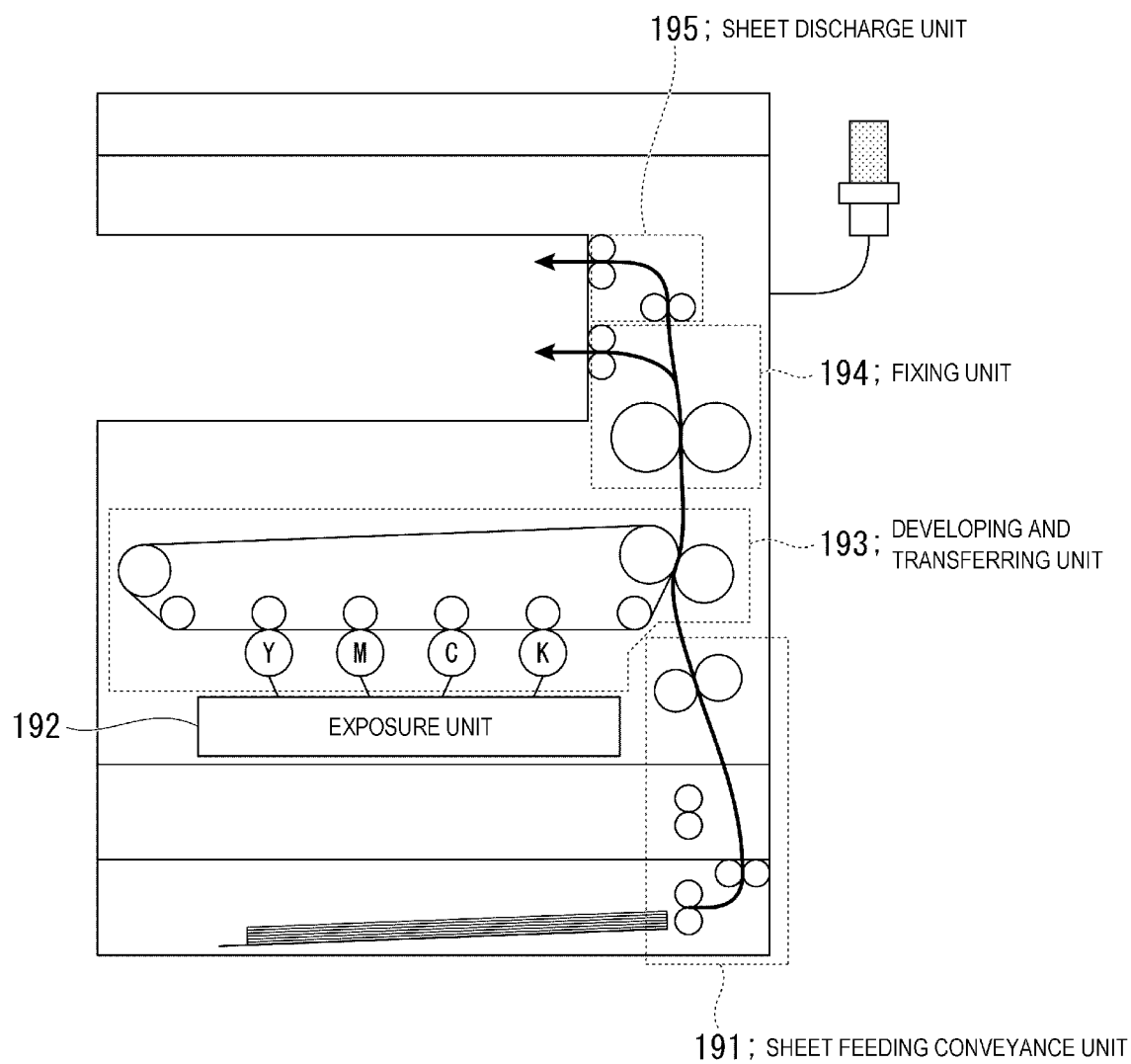
FIG. 5 illustrates a specific example of definitions of a plurality of units.

The abnormality information record control unit 182 causes each unit in the own device (image forming device 100) to operate individually. Such an operation is referred to as a "record operation". The unit refers to a unit constituted by one or a plurality of components included in the image forming device 100. Regarding the abnormality information recording processing, a plurality of units are defined in advance. It is desirable that one unit includes components that operate continuously in the normal image forming device 100. FIG. 5 illustrates a specific example of definitions of the plurality of units. For example, a sheet feeding conveyance unit 191, an exposure unit 192, a developing and transferring unit 193, a fixing unit 194, and a sheet discharge unit 195 may be defined.

The sheet feeding conveyance unit 191 is a unit including components that operate when paper feeding conveyance is performed. For example, components such as sheet feeding and separation rollers, a plurality of conveyance rollers, registration rollers (RGST rollers), and driving units of these rollers may be included in the sheet feeding conveyance unit 191. The exposure unit 192 is a unit including components that perform exposure processing. For example, the component such as an exposure device may be included in the exposure unit 192. The developing and transferring unit 193 is a unit including components that perform the image forming processing after the exposure processing and before fixing is performed. For example, components such as a transfer belt, a photosensitive drum, a developing device, and driving units thereof may be included in the developing and transferring unit 193. The fixing unit 194 is a unit including components that perform fixing processing. For example, components such as press rollers, first sheet discharge rollers, and driving units thereof may be included in the fixing unit 194. The sheet discharge unit 195 is a unit including components that perform sheet discharge processing. For example, components such as sheet discharge conveyance rollers, second sheet discharge rollers, and driving units thereof may be included in the sheet discharge unit 195.

When the abnormality information record control unit 182 causes each unit in the own device (image forming device 100) to operate individually, the abnormality information record control unit 182 causes the components in each unit to operate individually. Such a record operation is an operation different from an operation of normal image reading processing or normal image forming processing. That is, in the record operation, the abnormality information record control unit 182 causes the components simultaneously and concurrently operating in the normal image reading processing and the normal image forming processing to operate individually at different timings. At this time, the abnormality information record control unit 182 may cause each component to operate according to a predetermined order determined in advance. When the abnormality information record control unit 182 causes each unit in the own device (image forming device 100) to operate individually, the abnormality information record control unit 182 may record information (trigger information) indicating an operation start timing of each unit as the abnormality information.

The abnormality information record control unit 182 activates the sensor 160 and records the information acquired via the sensor 160 in the abnormality information storage unit 171 as the abnormality information. The information acquired via the sensor 160 may be, for example, an audio signal including audio occurring in the own device 100. The information acquired via the sensor 160 may be, for example, a signal indicating the vibration occurring in the own device 100. When the abnormal phenomenon occurrence instruction button 121 is operated, the abnormality information record control unit 182 records the information indicating the timing (abnormality occurrence timing) thereof in the abnormality information storage unit 171 as the abnormality information. When the abnormal phenomenon end instruction button 122 is operated, the abnormality information record control unit 182 records information indicating the timing (abnormality end timing) thereof in the abnormality information storage unit 171 as the abnormality information.

Figure 6:
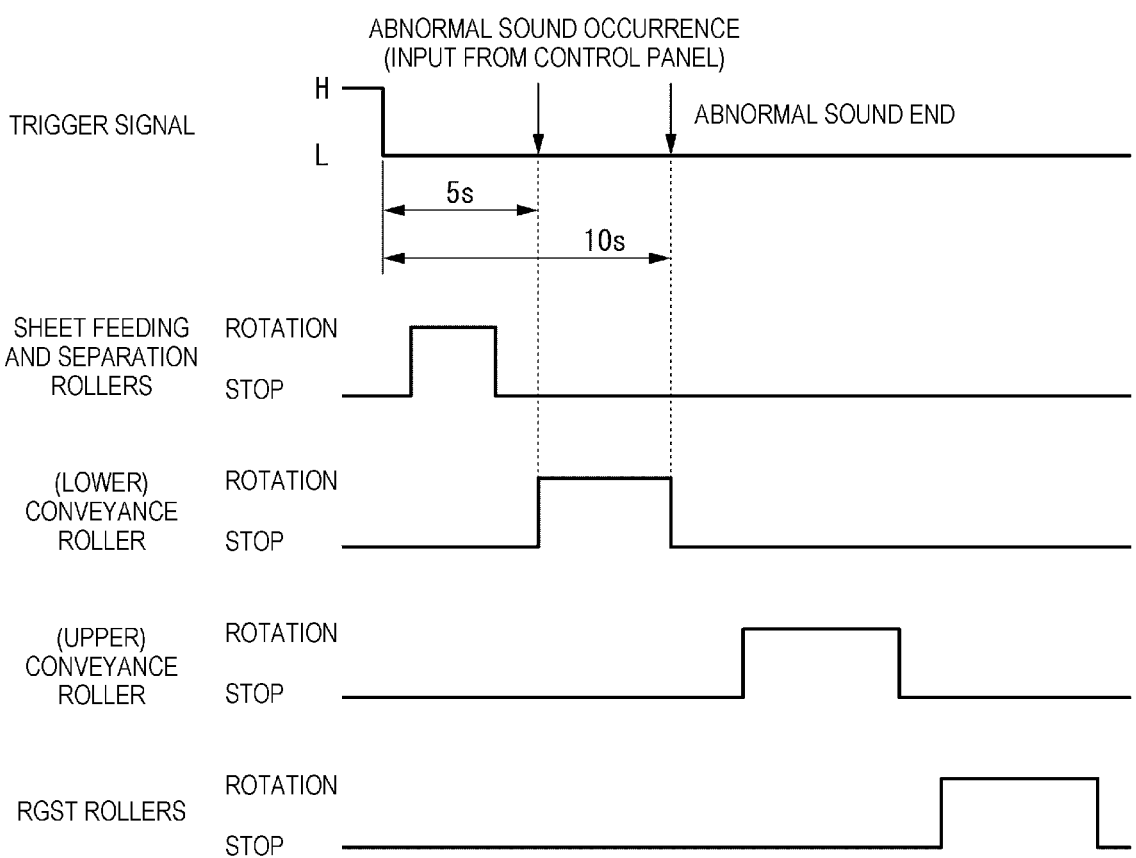
FIG. 6 illustrates a specific example of abnormality information recorded when a sheet feeding conveyance unit is operated.

FIG. 6 illustrates a specific example of abnormality information recorded when the sheet feeding conveyance unit 191 is operated. When the abnormality information record control unit 182 causes the sheet feeding conveyance unit 191 to operate, the abnormality information record control unit 182 records a trigger signal indicating an operation start timing of the sheet feeding conveyance unit 191. Thereafter, the abnormality information record control unit 182 causes the components included in the sheet feeding conveyance unit 191 to individually operate in a predetermined order and at a predetermined timing. In the example of FIG. 6, the abnormality information record control unit 182 first causes the sheet feeding and separation rollers to operate for a predetermined time. Next, the abnormality information record control unit 182 causes the conveyance roller positioned on a lower side to operate for a predetermined time. Next, the abnormality information record control unit 182 causes the conveyance roller positioned on an upper side to operate for a predetermined time. Then, the abnormality information record control unit 182 causes the RGST rollers to operate for a predetermined time. As illustrated in FIG. 6, the time during which each component is individually operated may be different depending on the components. The time during which each component is individually operated may be the same for each component. In the example of FIG. 6, the abnormal phenomenon occurrence instruction button 121 is operated at a timing at which the lower conveyance roller starts to operate. Then, the abnormal phenomenon end instruction button 122 is operated at a timing at which the operation of the lower conveyance roller ends.

Figure 7:
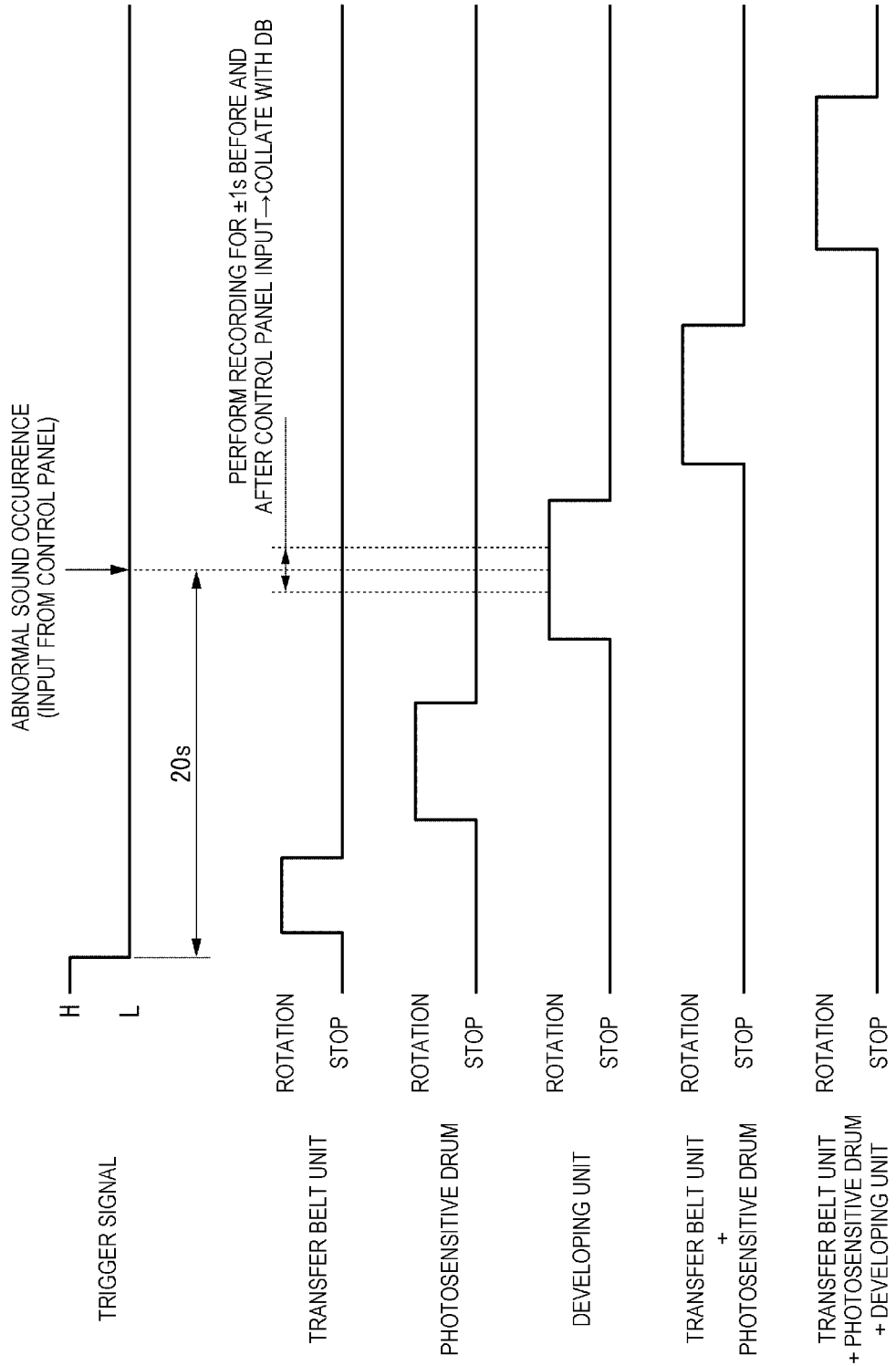
FIG. 7 illustrates a specific example of abnormality information recorded when a developing and transferring unit is operated.

FIG. 7 illustrates a specific example of abnormality information recorded when the developing and transferring unit 193 is operated. When the abnormality information record control unit 182 causes the developing and transferring unit 193 to operate, the abnormality information record control unit 182 records information (trigger information) indicating an operation start timing of the developing and transferring unit 193. Thereafter, the abnormality information record control unit 182 causes each component included in the developing and transferring unit 193 to operate individually in a predetermined order and at a predetermined timing. In the example of FIG. 7, the abnormality information record control unit 182 first causes the transfer belt unit to operate for a predetermined time. Next, the abnormality information record control unit 182 causes the photosensitive drum to operate for a predetermined time. Next, the abnormality information record control unit 182 causes a developing unit to operate for a predetermined time. Next, the abnormality information record control unit 182 causes the transfer belt unit and the photosensitive drum to simultaneously operate for a predetermined time. Then, the abnormality information record control unit 182 causes the transfer belt unit, the photosensitive drum, and the developing unit to operate simultaneously for a predetermined time. In this way, the abnormality information record control unit 182 may not only cause each component to operate individually, but also cause a combination of a plurality of components to operate simultaneously for a predetermined time. In the example of FIG. 7, the abnormal phenomenon occurrence instruction button 121 is operated at a timing after the developing unit is operated for a while.

Figure 8:
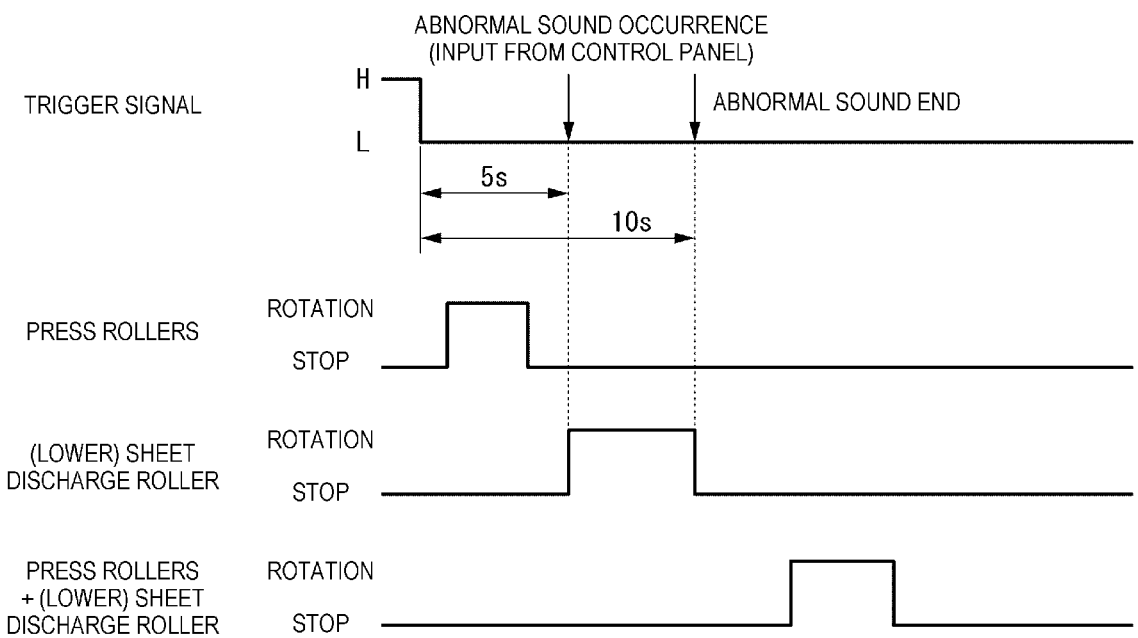
FIG. 8 illustrates a specific example of abnormality information recorded when a fixing unit is operated.

FIG. 8 illustrates a specific example of abnormality information recorded when the fixing unit 194 is operated. When the abnormality information record control unit 182 causes the fixing unit 194 to operate, the abnormality information record control unit 182 records a trigger signal indicating an operation start timing of the fixing unit 194. Thereafter, the abnormality information record control unit 182 causes each component included in the fixing unit 194 to operate individually in a predetermined order and at a predetermined timing. In the example of FIG. 8, the abnormality information record control unit 182 first causes the press rollers to operate for a predetermined time. Next, the abnormality information record control unit 182 causes the first sheet discharge rollers (sheet discharge rollers positioned on the lower side) to operate for a predetermined time. Then, the abnormality information record control unit 182 causes the press rollers and the first sheet discharge rollers to operate simultaneously for a predetermined time. In the example of FIG. 8, the abnormal phenomenon occurrence instruction button 121 is operated at a timing at which the first sheet discharge rollers start to operate. Further, the abnormal phenomenon end instruction button 122 is operated at a timing at which the operation of the first sheet discharge rollers ends.

Figure 9:
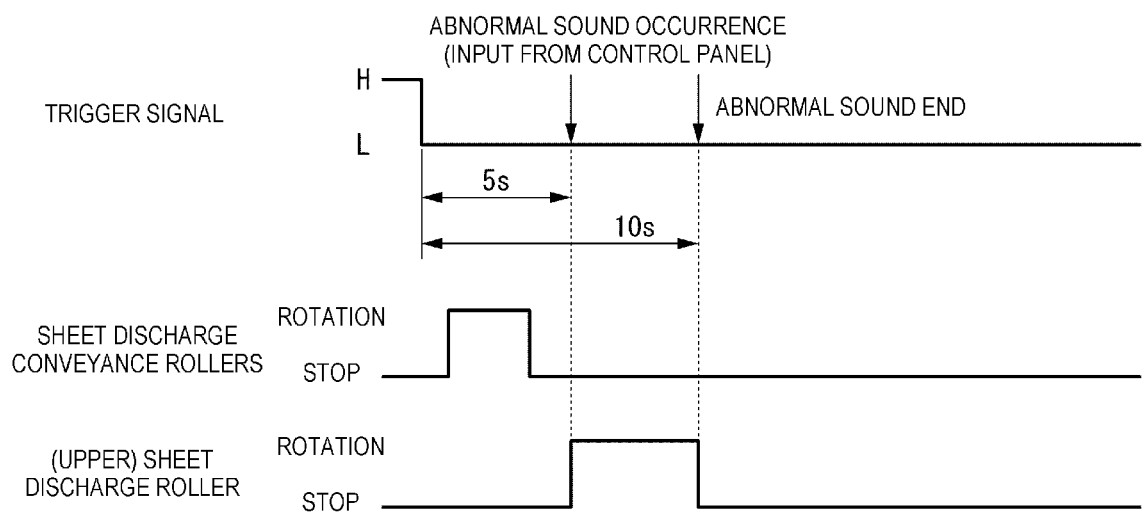
FIG. 9 illustrates a specific example of abnormality information recorded when a sheet discharge unit is operated.

FIG. 9 illustrates a specific example of abnormality information recorded when the sheet discharge unit 195 is operated. When the abnormality information record control unit 182 causes the paper discharge unit 195 to operate, the abnormality information record control unit 182 records a trigger signal indicating an operation start timing of the sheet discharge unit 195. Thereafter, the abnormality information record control unit 182 causes each component included in the sheet discharge unit 195 to operate individually in a predetermined order and at a predetermined timing. In the example of FIG. 9, the abnormality information record control unit 182 first causes the sheet discharge conveyance rollers to operate for a predetermined time. Next, the abnormality information record control unit 182 causes the second sheet discharge rollers (sheet discharge rollers positioned on the upper side) to operate for a predetermined time. In the example of FIG. 9, the abnormal phenomenon occurrence instruction button 121 is operated at a timing at which the second sheet discharge rollers start to operate. Further, the abnormal phenomenon end instruction button 122 is operated at a timing at which the operation of the second sheet discharge rollers ends.

Figure 10:
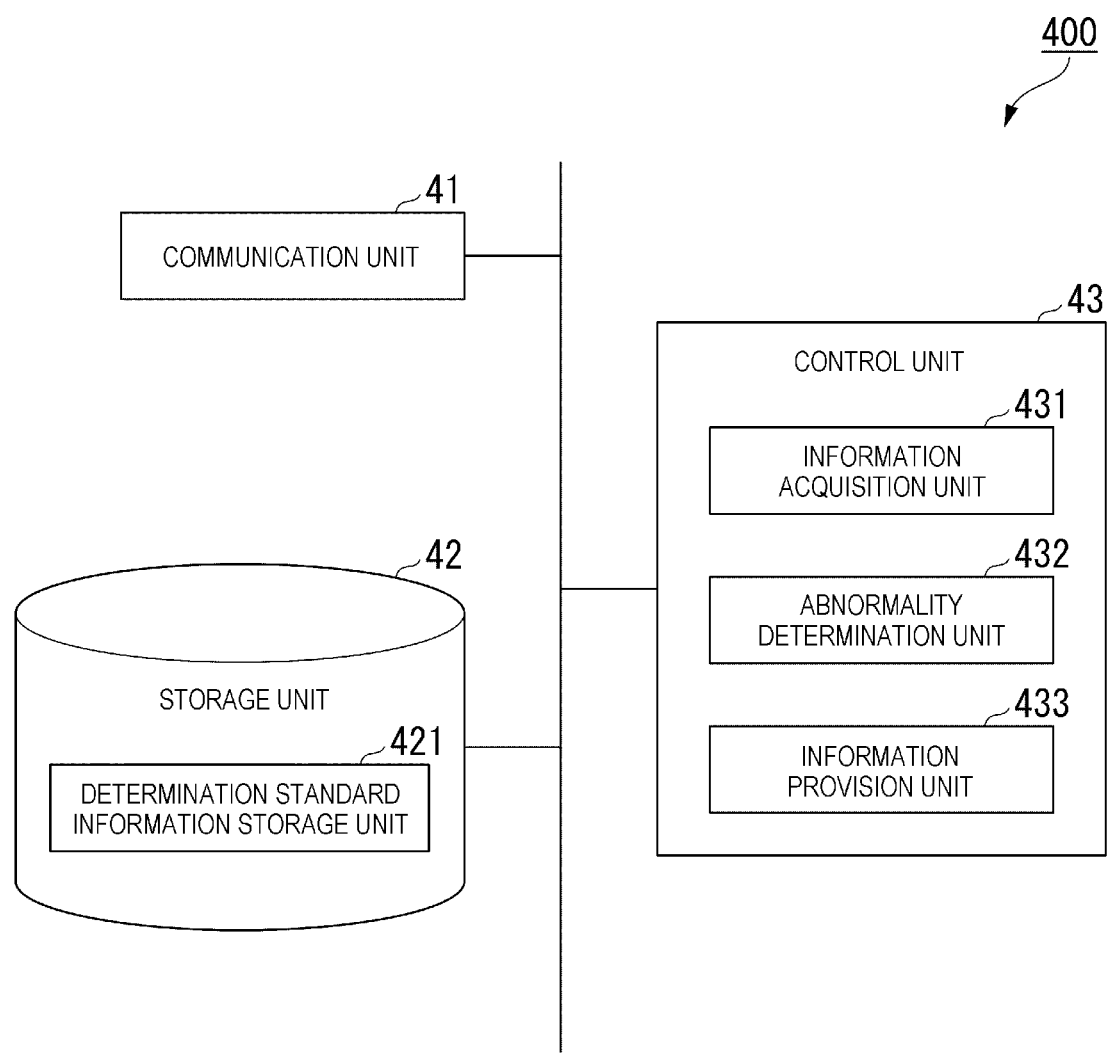
FIG. 10 illustrates a specific example of a functional block diagram illustrating a functional configuration of a determination device.

FIG. 10 illustrates a specific example of a functional block diagram illustrating a functional configuration of the determination device 400 according to the embodiment. The determination device 400 is configured using an information processing device such as a server device or a personal computer. The determination device 400 may be implemented using a plurality of information processing devices such as a cloud. The determination device 400 includes a communication unit 41, a storage unit 42, and a control unit 43.

The communication unit 41 is configured using a communication interface. The communication unit 41 communicates with other devices (for example, the image forming device 100 and the user terminal 300) via the network 510.

The storage unit 42 is configured using a storage device such as a magnetic hard disk device or a semiconductor storage device. The storage unit 42 stores data required when the determination device 400 operates. The storage unit 42 functions as, for example, a determination standard information storage unit 421.

The determination standard information storage unit 421 stores information (determination standard information) used in execution of determination processing in the control unit 43. The determination standard information is information for performing determination regarding the abnormality based on abnormality information recorded in the image forming device 100. For example, the determination standard information may be information in which feature data of the phenomenon (vibration or sound) that occurs in association with the occurrence of the abnormality and information indicating an abnormal portion corresponding to the feature data are associated with each other. For example, the determination standard information may be a learned model obtained by performing machine learning in advance using, as teacher data, the feature data of the phenomenon (vibration or sound) that occurs in association with the occurrence of the abnormality and the information indicating the abnormal portion corresponding to the feature data. For example, the determination standard information may be information in which a length of a time from a trigger to the abnormality occurrence timing is associated with information indicating an abnormal portion corresponding to the length of the time. In addition to the information described above, the determination standard information may further include a countermeasure against the abnormality in association with the determination standard information.

The control unit 43 is configured using a processor such as a CPU and a memory. The control unit 43 reads and executes a program stored in advance in the storage unit 42. The control unit 43 functions as, for example, an information acquisition unit 431, an abnormality determination unit 432, and an information provision unit 433.

The information acquisition unit 431 receives the abnormality information from the image forming device 100 via the network 510 using the communication unit 41.

The abnormality determination unit 432 executes abnormality determination processing on the abnormality information received by the information acquisition unit 431. In the abnormality determination processing, for example, a position (component) at which the abnormality occurs may be determined, or a type (a failure of a gear, a failure of a motor, or the like) of the occurring abnormality may be determined. In the abnormality determination processing, a countermeasure against the occurring abnormality may be further determined. The abnormality determination unit 432 may execute the abnormality determination processing, for example, as follows.

The abnormality determination unit 432 acquires a part of information on the abnormal phenomenon as processing target information based on information indicating that the abnormal phenomenon occurrence instruction button 121 is operated in the received abnormality information. For example, when it is recorded that the abnormal phenomenon occurrence instruction button 121 and the abnormal phenomenon end instruction button 122 are operated as illustrated in FIG. 6, information on the abnormal phenomenon during a period of time between the operations is acquired as the processing target information. For example, when it is not recorded that the abnormal phenomenon end instruction button 122 is operated as illustrated in FIG. 7, information on the abnormal phenomenon during a period of time around the timing at which the abnormal phenomenon occurrence instruction button 121 is operated is acquired as the processing target information.

More specifically, information during a predetermined time (for example, one second) before and after the timing at which the abnormal phenomenon occurrence instruction button 121 is operated may be acquired as the processing target information. As another specific example, information during a period of time from the timing at which the abnormal phenomenon occurrence instruction button 121 is operated until a predetermined time (for example, 2 seconds) elapses may be acquired as the processing target information.

The abnormality determination unit 432 determines a position at which the abnormality occurs, the type of the occurring abnormality, and the countermeasure against the abnormality based on the processing target information and the determination standard information.

The information provision unit 433 transmits information indicating the determination result determined by the abnormality determination unit 432 to the image forming device 100 that is a transmission source of the abnormality information. The information provision unit 433 may transmit the information indicating the determination result to the user terminal 300 held by the abnormality handling person of the image forming device 100 that is the transmission source of the abnormality information. In this case, the abnormality handling person inputs his or her own identification information to the image forming device 100. The input identification information is transmitted to the determination device 400 together with the abnormality information. In the storage unit 42, the identification information and a transmission destination address of the user terminal 300 held by the abnormality handling person corresponding to the identification information are stored in association with each other. The information provision unit 433 may determine the user terminal 300 serving as a transmission destination based on these pieces of information.

Figure 11:
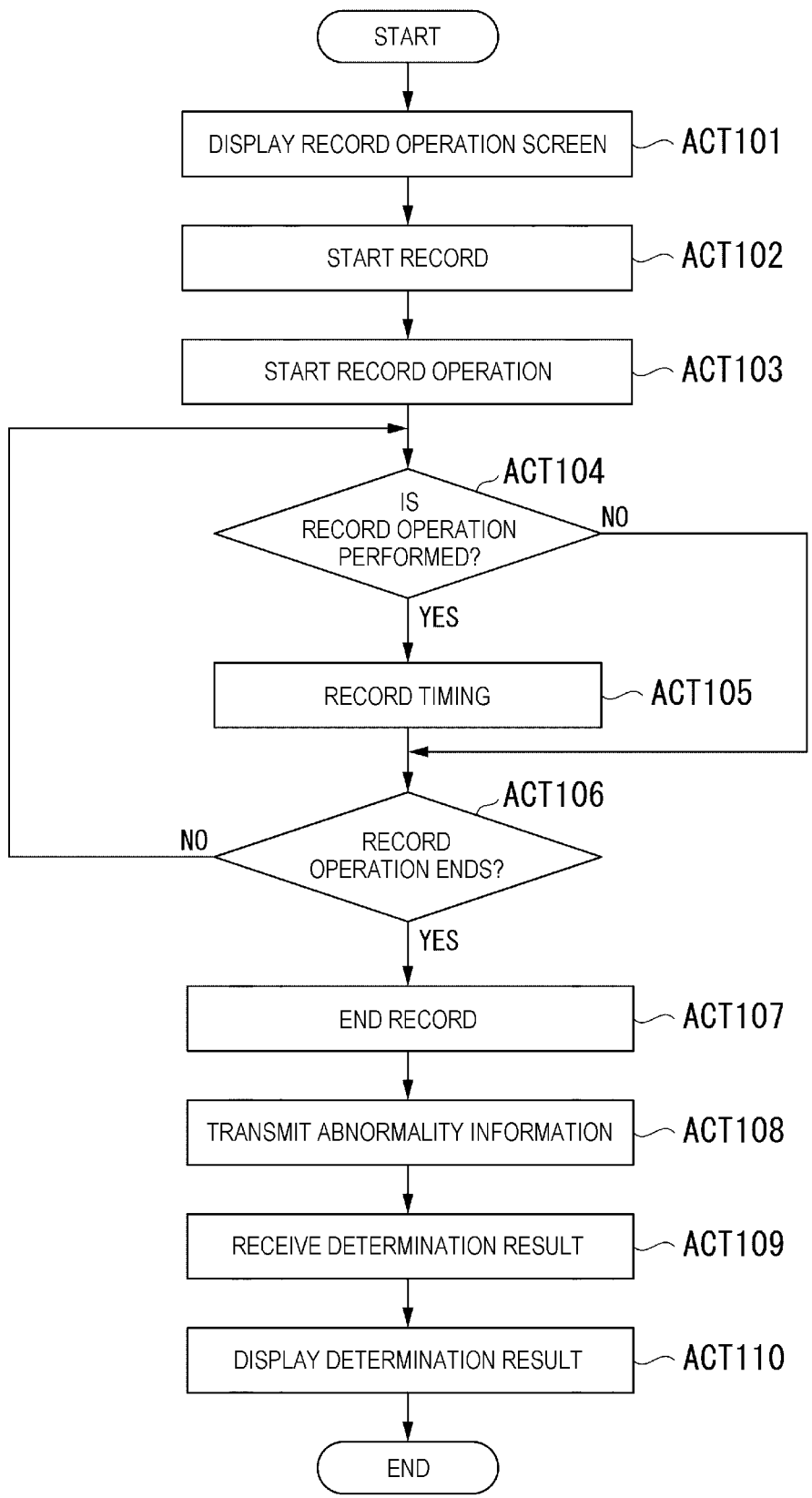
FIG. 11 is a flowchart illustrating a specific example of a record operation of the abnormality information in the image forming device.

FIG. 11 is a flowchart illustrating a specific example of a record operation of the abnormality information in the image forming device 100. First, the abnormality information record control unit 182 causes the control panel 120 to display the record operation screen (ACT 101). On the record operation screen, the abnormal phenomenon occurrence instruction button 121 is displayed. The abnormality information record control unit 182 starts recording the information on the abnormal phenomenon input via the sensor 160 (ACT 102). The abnormality information record control unit 182 starts the record operation (ACT 103).

When the abnormality handling person does not perform record operation (button operation) on the record operation screen (NO in ACT 104), the record operation is continued until the record operation is ended immediately (NO in ACT 106). On the other hand, when the abnormality handling person performs the record operation (button operation) on the record operation screen (YES in ACT 104), the abnormality information record control unit 182 records the timing at which the operation is performed and the type of the button on which the operation is performed (ACT 105). Then, the record operation is continued until the record operation is ended immediately (NO in ACT 106).

When the record operation is ended (YES in ACT 106), the abnormality information record control unit 182 ends the record of the abnormality information (ACT 107). The abnormality information record control unit 182 transmits the recorded abnormality information to the determination device 400 (ACT 108). Thereafter, the determination device 400 executes the determination processing based on the abnormality information, and transmits the determination result to the image forming device 100. When the abnormality information record control unit 182 of the image forming device 100 receives the determination result (ACT 109), the abnormality information record control unit 182 displays the received determination result on the control panel 120 (ACT 110).

According to the image forming system 600 configured as described above, it is possible to record the timing at which the abnormality handling person determines that the abnormality occurs when acquiring the information on the abnormal phenomenon. Therefore, it is possible to more efficiently determine the abnormality based on the recorded information. More specifically, in the record operation, the record operation screen is displayed on the control panel. By operating the button displayed on the record operation screen, the abnormality handling person can easily record the timing at which the abnormality occurs.

(First Modification)

Figure 12:
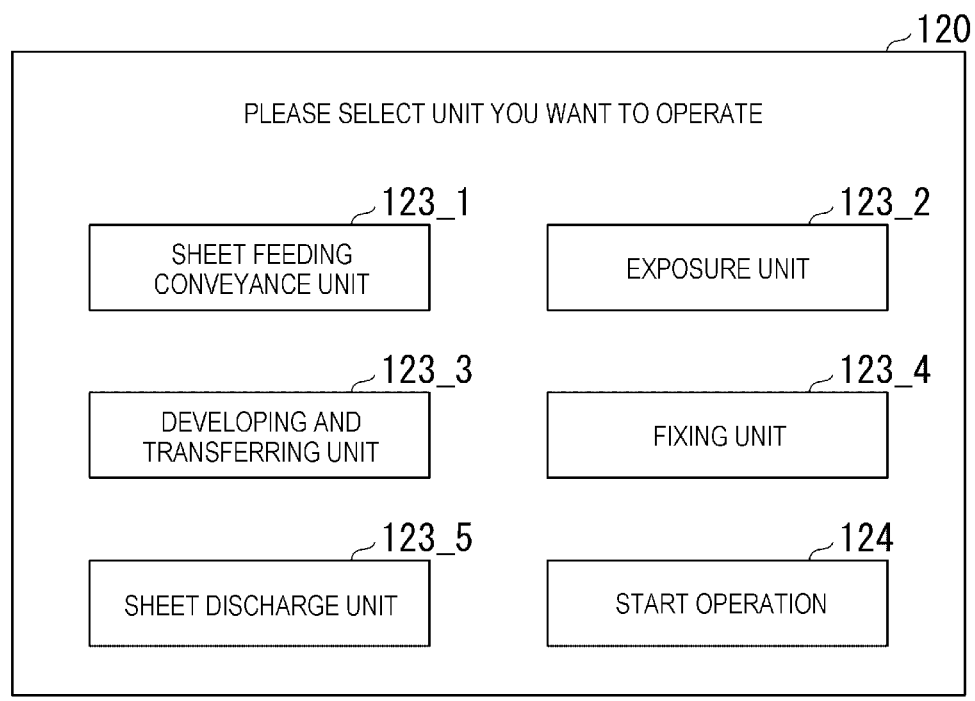
FIG. 12 illustrates a specific example of a record operation screen displayed in the image forming device according to a first modification.

A first modification of the image forming system 600 will be described. In the first modification of the image forming system 600, a configuration of the image forming device 100 is different from that described above. FIG. 12 illustrates a specific example of a record operation screen displayed on the image forming device 100 according to the first modification. A plurality of unit selection buttons 123 and an operation start button 124 are displayed on the record operation screen displayed in FIG. 12. The unit selection button 123 is a button indicating a unit that individually operates in a record operation. An abnormality handling person can select a unit he/she wants to operate in the record operation by operating the unit selection button 123. That is, the abnormality information record control unit 182 causes only a unit corresponding to one or a plurality of unit selection buttons 123 operated on the record operation screen to operate. When the operation start button 124 is operated, the abnormality information record control unit 182 causes the selected unit to start operating.

Figure 13:
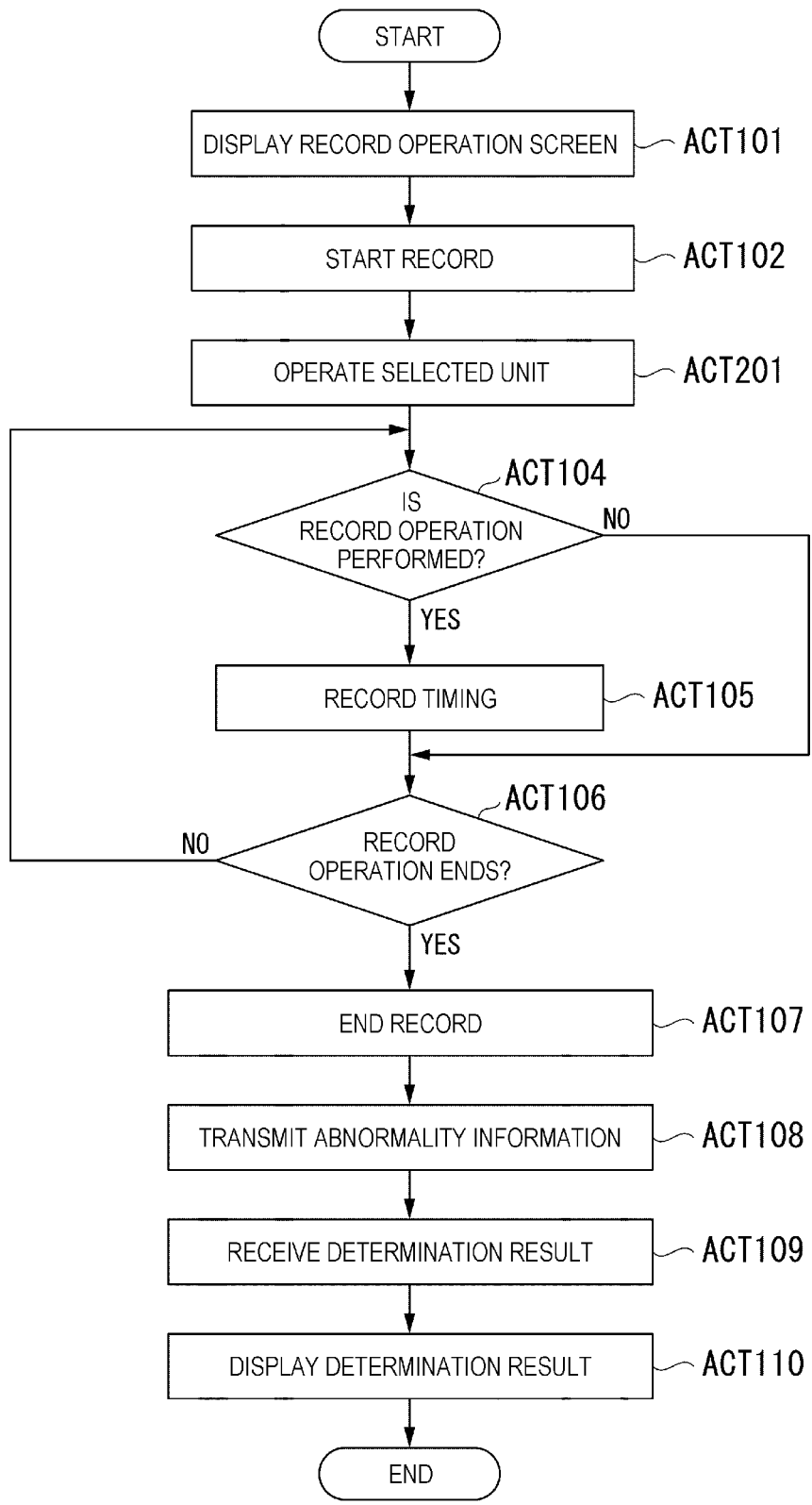
FIG. 13 is a flowchart illustrating a modification of the record operation.

FIG. 13 is a flowchart illustrating a modification of a record operation of abnormality information in the image forming device 100. After starting recording in ACT 102, the abnormality information record control unit 182 causes only the selected unit to operate individually (ACT 201). Thereafter, the same processing as ACT 104 and the following processing of FIG. 11 is executed.

With this configuration, only the unit selected by the abnormality handling person is operated. Therefore, a time required for recording the abnormality information can be reduced.

(Second Modification)

Figure 14:
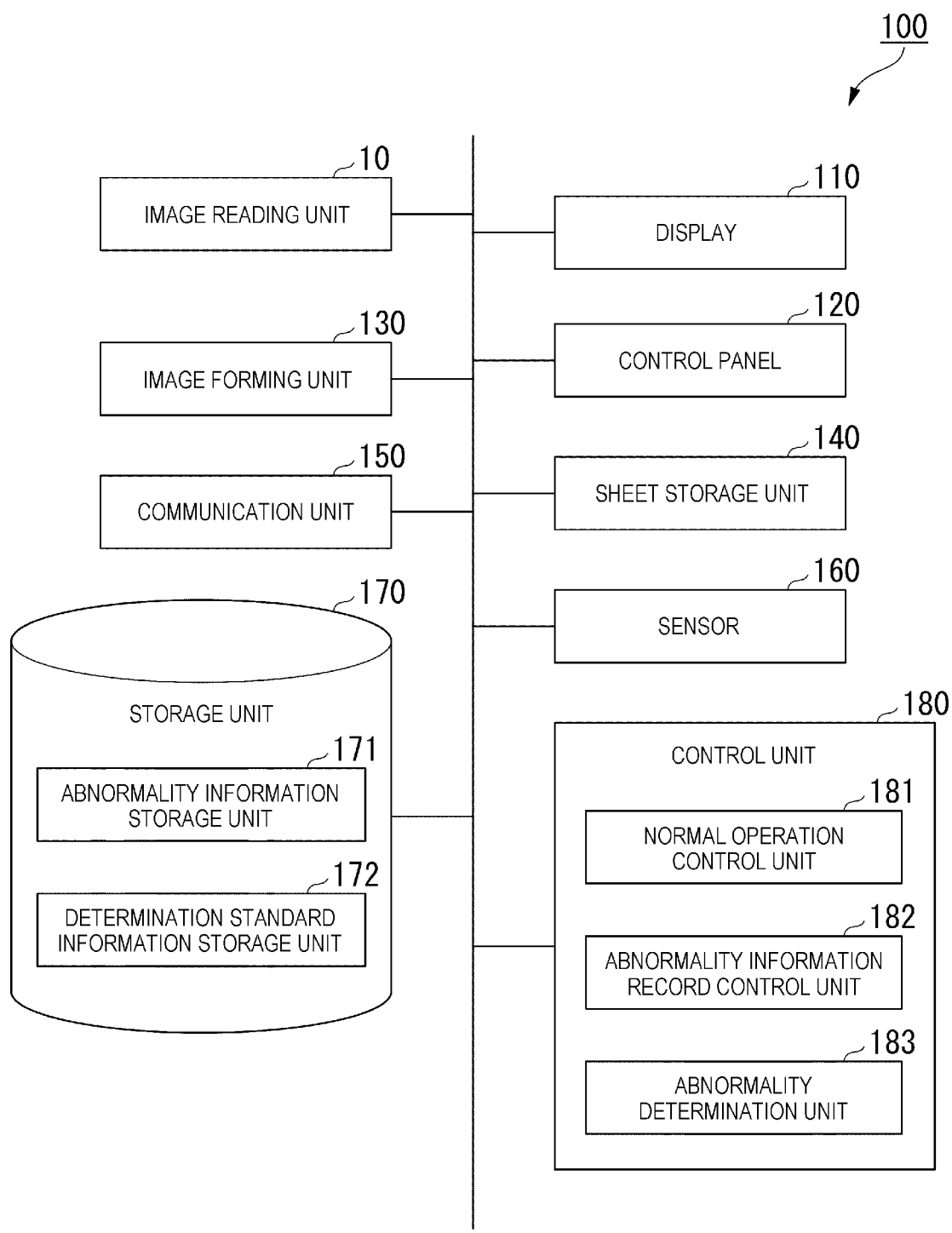
FIG. 14 illustrates a configuration example of the image forming device according to a second modification.

A second modification of the image forming system 600 will be described. In the second modification of the image forming system 600, a configuration of the image forming device 100 is different from that described above. FIG. 14 illustrates a configuration example of the image forming device 100 according to the second modification. In the second modification, the storage unit 170 further operates as a determination standard information storage unit 172, and the control unit 180 further operates as an abnormality determination unit 183. The determination standard information storage unit 172 stores the same information as that of the determination standard information storage unit 421 of the determination device 400. The abnormality determination unit 183 executes the same processing as that of the abnormality determination unit 432 of the determination device 400. In the second modification of the image forming system 600, the determination device 400 is not necessarily provided.

With this configuration, the image forming device 100 can acquire a determination result without communicating with the determination device 400.

(Third Modification)

Figure 15:
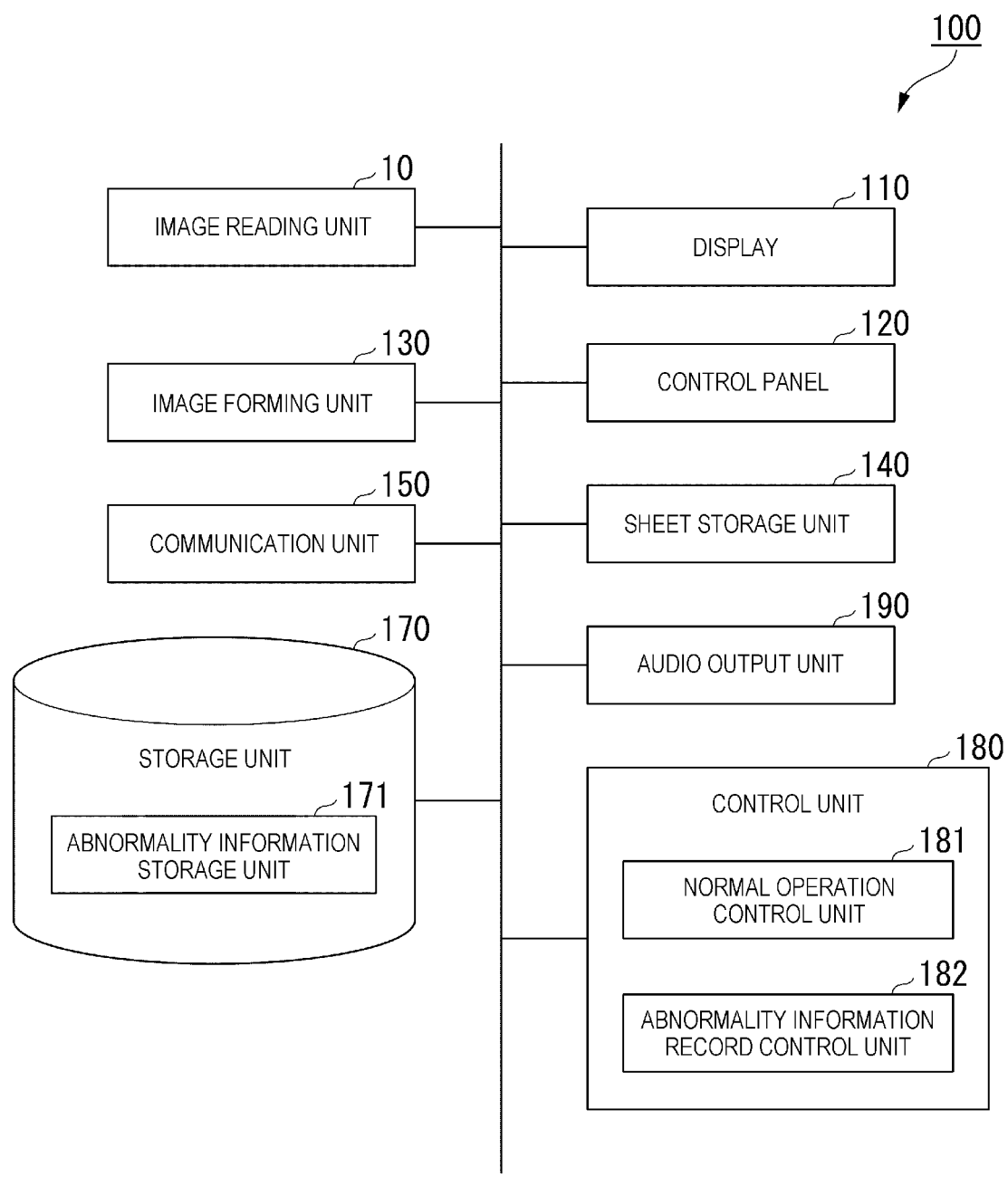
FIG. 15 illustrates a configuration example of the image forming device according to a third modification.

A third modification of the image forming system 600 will be described. In the third modification of the image forming system 600, configurations of the image forming device 100 and the user terminal 300 are different from those described above. FIG. 15 illustrates a configuration example of the image forming device 100 according to the third modification. The image forming device 100 according to the third modification does not include the sensor 160 and includes an audio output unit 190. The audio output unit 190 outputs an audio under control of the control unit 180. The audio output unit 190 is configured using, for example, an audio output device such as a speaker or a buzzer device.

The abnormality information record control unit 182 according to the third modification does not execute recording (for example, recording of a sound or a vibration) of information on an abnormal phenomenon via the sensor 160. Meanwhile, the abnormality information record control unit 182 executes display of a record operation screen on the control panel 120. In addition, the abnormality information record control unit 182 also executes processing of causing each unit in the own device (image forming device 100) to operate individually. The abnormality information record control unit 182 outputs a predetermined audio from the audio output unit 190 at an operation start timing of each unit. The abnormality information record control unit 182 outputs a predetermined audio from the audio output unit 190 at a timing at which the abnormal phenomenon occurrence instruction button 121 is operated. The abnormality information record control unit 182 outputs a predetermined audio from the audio output unit 190 at a timing at which the abnormal phenomenon end instruction button 122 is operated. The audio to be output at the operation start timing of each unit, the audio to be output when the abnormal phenomenon occurrence instruction button 121 is operated, and the audio to be output when the abnormal phenomenon end instruction button 122 is operated may be the same or different.

The user terminal 300 according to the third modification starts recording in response to an operation of a user. A sound recorded by the user terminal 300 includes a sound accompanying an abnormal phenomenon occurring while the abnormality information record control unit 182 causes each unit to operate individually. The sound recorded by the user terminal 300 also includes the audio output from the audio output unit 190 by the abnormality information record control unit 182. The user terminal 300 transmits recorded data to the determination device 400 together with identification information indicating the image forming device 100 to be processed.

When the determination device 400 receives the recorded data from the user terminal 300, the determination device 400 performs determination processing based on the received data. At this time, the timing at which the abnormal phenomenon occurrence instruction button 121 or the abnormal phenomenon end instruction button 122 is operated is determined based on the audio from the audio output unit 190 included in the recorded data. The determination device 400 identifies the image forming device 100 to be processed based on the received identification information, and determines the image forming device 100 as a transmission destination of the determination result. The determination device 400 transmits the determination result to the image forming device 100 to be processed. The abnormality information record control unit 182 of the image forming device 100 displays the determination result received from the determination device 400 on the control panel 120.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An image forming device, comprising:
   an image display device;
   a sensor configured to acquire information on a phenomenon that occurs in association with an abnormality in the image forming device;
   a storage unit configured to store an abnormality information;
   a first unit including a plurality of components and configured to perform a part of image forming processing;
   a second unit including a plurality of components and configured to perform processing that is a part of the image forming processing and is different from the processing performed by the first unit; and
   a controller configured to:
      operate the first unit and the second unit at different timings,
      display an abnormality occurrence instruction button that causes a user to instruct a timing at which the abnormality occurs and an abnormality end instruction button that causes a user to instruct a timing at which the abnormality ends on the image display device; and
   store the record, as abnormality information, an information indicating an abnormality occurrence timing when the abnormality occurrence instruction button is operated, an information indicating an abnormality end timing when the abnormality end instruction button is operated, and the information acquired by the sensor.

2. The image forming device according to claim 1, wherein the sensor is configured using an audio sensor or an acceleration sensor.

3. The image forming device according to claim 1, wherein
   when operating the first unit, the controller operates the plurality of components included in the first unit at different timings in at least a part of a time of operating.

4. The image forming device according to claim 3, wherein
   when operating the first unit, the controller operates a combination of a part of the plurality of components included in the first unit at a same timing in at least a part of the time of operating.

5. The image forming device according to claim 1, further comprising:
   a communication component, wherein
   the controller transmits the abnormality information from the communication component to another device, receives a result of determination processing regarding the abnormality performed in the another device based on the abnormality information, and outputs the result of the determination processing to the image display device.

6. The image forming device according to claim 5, wherein
the another device is a user terminal.

7. The image forming device according to claim 6, wherein
the user terminal is one of a smartphone, a tablet, a mobile phone, or a personal computer.

8. The image forming device according to claim 1, wherein
the controller determines, based on the abnormality information, a position at which the abnormality occurs or a type of the occurring abnormality, and outputs a determination result to the image display device.

9. A control method for an image forming device,
the image forming device including:
an image display device;
a sensor configured to acquire information on a phenomenon that occurs in association with an abnormality in the image forming device;
a storage unit configured to store an abnormality information;
a first unit including a plurality of components and configured to perform a part of image forming processing;
a second unit including a plurality of components and configured to perform processing that is a part of the image forming processing and is different from the processing performed by the first unit, and the control method comprising:
operating, by the image forming device, the first unit and the second unit at different timings;
performing, by the image forming device, display of an abnormality occurrence instruction button that causes a user to instruct a timing at which the abnormality occurs and an abnormality end instruction button which causes a user to instruct a timing at which the abnormality ends on the image display device; and
recording, by the image forming device, as abnormality information, an information indicating an abnormality occurrence timing when the abnormality occurrence instruction button is operated, an information indicating an abnormality end timing when the abnormality end instruction button is operated, and the information acquired by the sensor.

10. The control method according to claim 9, wherein:
the sensor is configured using an audio sensor or an acceleration sensor.

11. The control method according to claim 9, further comprising:
when operating the first unit, operating the plurality of components included in the first unit at different timings in at least a part of a time of operating.

12. The image forming device according to claim 11, further comprising:
when operating the first unit, operating a combination of a part of the plurality of components included in the first unit at a same timing in at least a part of the time of operating.

13. The control method according to claim 9, further comprising:
transmitting the abnormality information from a communication component to another device;
receiving a result of determination processing regarding the abnormality performed in the another device based on the abnormality information; and
outputting the result of the determination processing to the image display device.

14. The control method according to claim 9, further comprising:
determining, based on the abnormality information, a position at which the abnormality occurs or a type of the occurring abnormality; and
outputting a determination result to the image display device.

15. An image forming device, comprising:
an image display device;
a first unit including a plurality of components and configured to perform a part of image forming processing;
a second unit including a plurality of components and configured to perform processing that is a part of the image forming processing and is different from the processing performed by the first unit;
a controller configured to operate the first unit and the second unit at different timings and perform display of an abnormality occurrence instruction button that causes a user to instruct a timing at which an abnormality occurs and an abnormality end instruction button which causes a user to instruct a timing at which the abnormality ends on the image display device; and
an audio output device configured to output audio at a timing at which the operation starts timing of each the first unit and the second unit, output audio at a timing at which the abnormality occurrence instruction button is operated, and output audio at a timing at which the abnormality end instruction button is operated.

16. The image forming device according to claim 15, wherein
when operating the first unit, the controller operates the plurality of components included in the first unit at different timings in at least a part of a time of operating.

17. The image forming device according to claim 16, wherein
when operating the first unit, the controller operates a combination of a part of the plurality of components included in the first unit at a same timing in at least a part of the time of operating.

18. The image forming device according to claim 15, further comprising:
a communication component, wherein
the controller transmits abnormality information from the communication component to another device, receives a result of determination processing regarding the abnormality performed in the another device based on the abnormality information, and outputs the result of the determination processing to the image display device.

19. The image forming device according to claim 15, wherein
the controller determines, based on abnormality information, a position at which the abnormality occurs or a type of the occurring abnormality, and outputs a determination result to the image display device.

* * * * *